United States Patent
Ahmed et al.

(10) Patent No.: US 7,085,364 B1
(45) Date of Patent: Aug. 1, 2006

(54) ADVANCED CONFERENCE DROP

(75) Inventors: Mushtaq Ahmed, Salem, NH (US); Kalpesh Salva, Woburn, MA (US); Tarek Abou-Assali, Brighton, MA (US); Jasjit Singh, North Andover, MA (US); Arun Narula, Andover, MA (US)

(73) Assignee: 3Com Corporation, Marlborough, MA (US)

( * ) Notice: Subject to any disclaimer, the term of this patent is extended or adjusted under 35 U.S.C. 154(b) by 683 days.

(21) Appl. No.: 09/933,558

(22) Filed: Aug. 20, 2001

(51) Int. Cl.
*H04M 3/42* (2006.01)
*H04L 12/16* (2006.01)

(52) U.S. Cl. .................... 379/202.01; 370/267
(58) Field of Classification Search ............... 370/267, 370/419; 379/202.01; 709/204, 205; 715/739
See application file for complete search history.

(56) References Cited

U.S. PATENT DOCUMENTS

| | | | |
|---|---|---|---|
| 5,440,624 A * | 8/1995 | Schoof, II | 379/202.01 |
| 5,996,003 A * | 11/1999 | Namikata et al. | 709/205 |
| 6,262,979 B1 * | 7/2001 | Anderson et al. | 370/267 |
| 6,332,153 B1 * | 12/2001 | Cohen | 709/204 |
| 6,396,510 B1 * | 5/2002 | Pendse et al. | 715/739 |

* cited by examiner

Primary Examiner—Wing Chan
Assistant Examiner—Thjuan P. Knowlin
(74) Attorney, Agent, or Firm—McGlew & Tuttle, PC (57) ABSTRACT

A network telephone system is provided with a distributed network, a network call processor, with the call processor connected to the network. A telephone line network interface is connected to a telephone line and is connected to the network for receiving packets from the network and sending packets to the network including packets with telephone voice data. A plurality of network telephones are part of the network telephone system with each network telephone connected to the network. Each network telephone has a display for displaying information and each network telephone is capable of engaging in a concurrent telephonic communication. Each network telephone has an I/O device in electrical communication with the network for receiving and sending packets to other devices connected to the network, an input device for producing audio signals from an input local to the device and a packet controller in electrical communication with the I/O device and the input device. The packet controller generates packets from the audio signals received by the input device, forwards the generated packets to the I/O device for transmission to the network and combines packets received by the I/O device to produce an audio signal with the combined packets and the audio signals from the local input device. Each network telephone displays information on the display corresponding to an identity of a source of packets combined whereby the identity may be selected for dropping a source form a concurrent telephonic communication.

20 Claims, 6 Drawing Sheets

ADVANCED CONFERENCE DROP

BACKGROUND OF THE INVENTION

Telephone systems are known which provide a common interface between a plurality of users and a public telephone network. Such a PBX system includes a central box with line cards providing connections to assigned lines of a public telephone network. The central box is connected by wires such as twisted pair wires to individual telephone units. The connection from the central box to the telephone units may be by way of analogue or digital signals. More recently, digital signals are sent by the central unit to the phone units. The digital signals include voice data as well as control and messaging data. The units include a simple handset as well as a speaker for paging, intercom type communications and speaker phone applications. Typically the base unit also includes a microphone. The handset is a typical handset providing a speaker and a microphone.

Telephone systems using distributed networks, such as local area networks (LANs) are also generally known. With these systems, a distributed network is provided, such as carrier sense multiple access/collision detection (CSMA/CD, see IEEE 802.3) generally known as Ethernet. A telephone network system is provided with a central box having line cards connected to the distributed network as well as network devices connected to the network. The network devices include network telephones with, for example, a base unit with a speaker and a microphone and a handset (with a speaker and a microphone). Data packets are sent over the network between network devices. A network control processor or network call processor (NCP) may be used to monitor and control the access to the public telephone network. Features specific to the user may be established with the NCP.

Digital PBX systems and telephone systems using distributed networks are known which allow the users to provide a conference call. The conference call may be between users of the telephone system or between a user of the telephone system and telephone units connected through outside lines. Even when the conference call is set up using the telephone system, such past systems do not allow users to selectively drop participants in the conference call. In such systems, the originator of the conference call may at best be able to drop the last participant that was added. Further, people do not know who all of the memners are, on the call at any given moment. Conference call members tend to constantly ask who is on the call or is not etc. Some conference call systems notify the members that some user has just joined or departed a conference. However, this still makes it difficult to keep a track of the total member list.

SUMMARY AND OBJECTS OF THE INVENTION

It is an object of the invention to provide three or more telephone units interconnected by one or more networks e.g., local area network (LAN), wide area network, etc., to provide a conference call, wherein at least one of the telephone units receives and sends data packets including voice data packets and wherein at least one telephone unit includes or is associated with a display showing information as to the other telephone units connected, e.g., telephone numbers, and includes or is associated with a button e.g., a physical button or soft key associated with a display or physical button with changeable (soft key) display for dropping any one of a telephone units from the conference call.

A further object to provide the several packet based telephone units with the ability to drop any telephone unit in the conference call where several of the units are connected by one or more networks to form a branch exchange It is still another object of the invention to provide a network telephone system with telephone units that receive information about conference call participants from a central call processor. The network advantageously includes network telephone units as well as other network devices (such as computers).

According to the invention, a conference call telephone system is provided with one or more networks. Three or more telephone units are interconnected by said one or more networks to provide three or more participants of a conference call, at least one of the telephone units receiving and sending data packets including voice data packets. A display is connected to the at least one of the telephone units or forms a part of the at least one of the telephone units. A device for monitoring calls, of at least one of the telephone units, provides data to the display for showing conference call participant information as to the telephone units participating in the conference call. An input device is associated with the display for selecting any of the telephone units from the conference call participant information and dropping the selected telephone unit from the conference call.

Several of the three or more telephone units of the conference call may be network telephone devices that receive and send data packets including voice data packets. The network telephone units may be connected to a telephone line network interface for receiving data packets including packets with telephone voice data. The telephone units from the conference call may include a telephone unit connected to the others by a public telephone network. The telephone line network interface is connected to the public telephone network to establish one or more line connections to one or more telephone units to form a branch exchange.

The display may be provided as part of at least one of the telephone units receiving and sending data packets. The input device may be provided as part of the at least one of the telephone units receiving and sending data packets. The input device may then include a button positioned adjacent to the display with a portion of the display indicating the function of the button. As a further feature, or as an alternative, the display may be associated with a computer network device. The input device is provided as part of the computer network device. The input device may include web browser software operating on the computer network device and accessing information from the device for monitoring calls for showing conference call participant information as to the telephone units participating in the conference call and for sending a command to drop any selected telephone unit from the conference call.

The device for monitoring calls may be a common system unit connected to the telephone network or it may be associated with each network telephone device. A network call processor connected to the network may monitor data traffic to and from all of the plurality of network telephones. This call processor can establish a conference call including generating a list of all participants and forwarding the list to one or more of the network telephones in the list of all participants. The telephones may then send data packets as multicast or unicast transmissions to the network. The transmissions may be addressed based on the list of all participants. The conference call participants in the list of participants may include telephone units outside of the distributed network, connected to the distributed network via a line interface. These multicast or unicast transmissions may include transmissions addressed to the line interface.

The network call processor connected to the network for monitoring data traffic to and from the network telephones may also establish a conference call by generating an identifier associated with the conference call and forwarding the identifier to one or more of the network telephones in the list of all participants. The network telephones in the list of all participants may then send multicast transmissions to the network address based on the identifier associated with the conference call. Telephone units outside of the distributed network receive and send voice data via the line interface.

According to a further aspect of the invention, a telephone conference call process is provided including providing a network, providing at least three telecommunication devices connected to the network (e.g., directly as network telephone devices or indirectly via a line card and public telephone network). At least one of the three telecommunication devices receives and sends packets including voice data. The received packets from the other participants are combined by the telecommunication device for concurrent telephonic communications and for producing an audio signal with the combined packets. The process forms a list of telecommunication devices participating in the concurrent telephonic communications and displays all or a part of the list at one of the at least three telecommunication devices. A user of the packet based telecommunication device removes one or more of the devices participating in the concurrent telephonic communications by selecting the one or more of the devices participating in the concurrent telephonic communications from the list.

A preferred embodiment uses a network telephone system with a distributed network, a network call processor with data storage forming a central database with the call processor connected to the network. A telephone line network interface is connected to a telephone line and is connected to the network for receiving packets from the network and sending packets to the network including packets with telephone voice data. A plurality of network telephones are part of the network telephone system with each network telephone connected to the network. Each network telephone has a display for displaying information and each network telephone is capable of engaging in a concurrent telephonic communication. Each network telephone has an I/O device in electrical communication with the network for receiving and sending packets to other devices connected to the network, an input device for producing audio signals from an input local to the device and a packet controller in electrical communication with the I/O device and the input device. The packet controller generates packets from the audio signals received by the input device, forwards the generated packets to the I/O device for transmission to the network and combines packets received by the I/O device to produce an audio signal with the combined packets and the audio signals from the local input device. Each network telephone displays information on the display corresponding to an identity of a source of packets combined whereby the identity may be selected for dropping a source form a concurrent telephonic communication.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
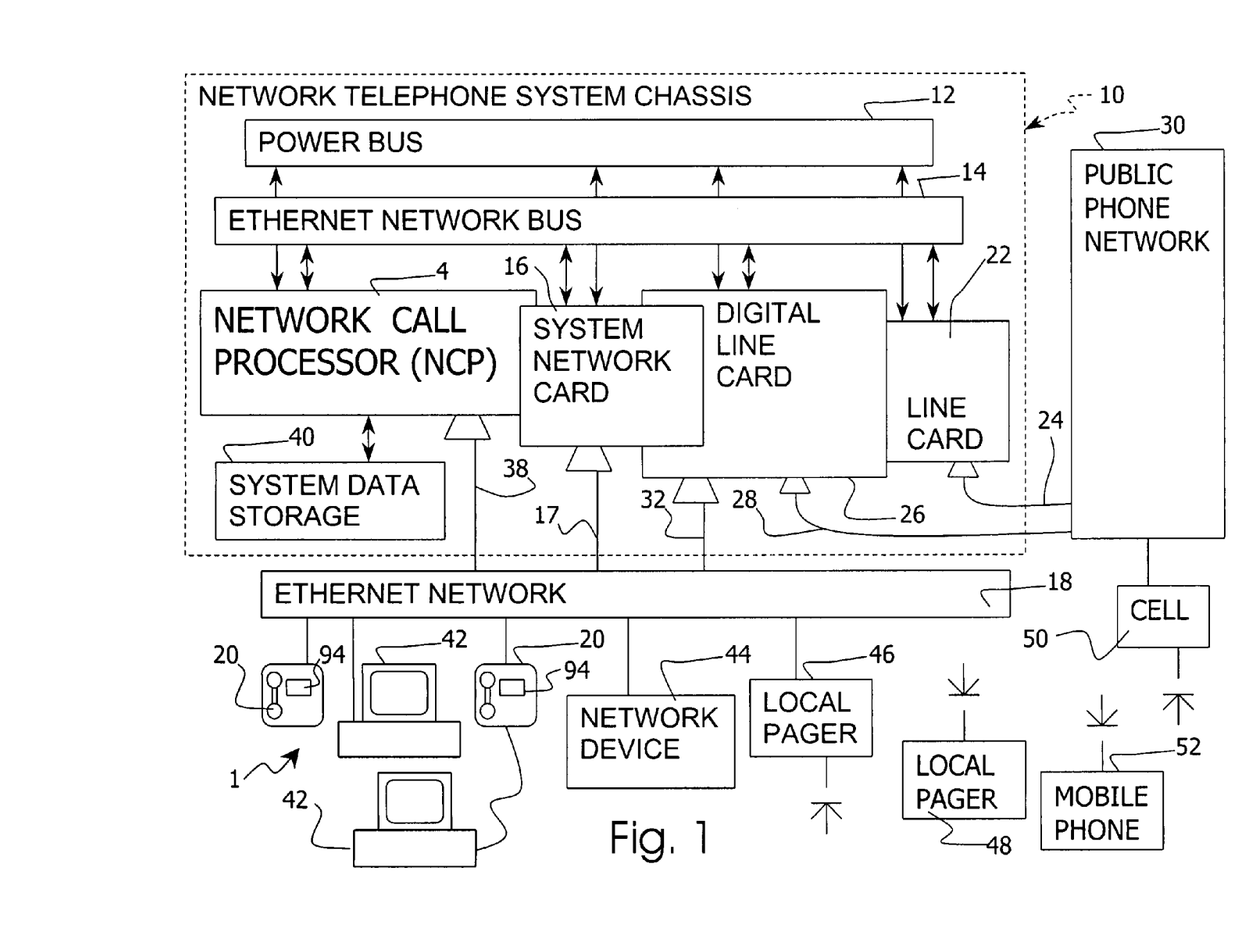
FIG. 1 is a system diagram showing system features according to an embodiment of the invention.

Referring to the drawings in particular, the invention comprises a network telephone system generally designated 1. The system includes a network call processor (NCP) 4. The NCP 4 monitors the network system 1.

The telephone network system 1 is provided as part of a digital distributed network (e.g., a LAN) Ethernet network 18. The network 18 comprises network media (such as twisted pair of various types and categories of cable, infrared, wireless etc.). The preferred embodiment includes twisted pair wiring connected via a hub/router or switch. The network 1 may be established using network software (NOVELL, WINDOWS NT, etc.) run on a server for communication between computers 42, network telephones and other network devices and 46 (a network device in the form of a local pager 46, which may be connected to the Ethernet network 18 to send a radio frequency signal to a local pager device 48). The public telephone network 30 is connected to a cellular network 50 which communicates with mobile phones such as mobile phone 52, other phones connected to the public network and other services (e.g., wide area paging). Although specific examples are given, various connections may be made to local area networks and to wide area networks.

A preferred embodiment of the invention provides a network telephone system with the network telephone devices 20 (e.g. telephones 20 for users at a facility). In the embodiment shown the NCP 4 is provided in a network telephone system chassis 10 that provides power through power bus 12 and provides a network connection through the Ethernet network bus 14. The NCP 4 is connected to the Ethernet network bus 14 and the power bus 12. The system network card 16 provides a connection 17 from the NCP 4 to the Ethernet network 18. The network telephones 20 are connected to the Ethernet network 18 as network devices. A line card 22 is also connected to the power bus 12 and Ethernet bus 14. The line card 22 is connected to a public switched telephone network (PSTN or other data network) 30 as shown at 24. Other line cards such as a digital line card 26 may also be provided (e.g., a T1 line). The digital line card 26 is also connected to the public phone network or other data network 30 as shown at 28. The digital line card 26 is connected to bus 14 and may also be directly connected to the Ethernet network 18 as shown at 32. The NCP 4 may also be connected directly to the Ethernet network as shown at 38.

The particular arrangement shown is not critical to the system of the invention. Any of the units shown in the network telephone system chassis 10 may be provided separately or in combination with other network devices. The invention also applies to a single unit 20 having the capabilities noted herein and sending voice data packets over the internet to other telephone units to establish a conference call. In the embodiment shown in FIG. 1 system data storage 40 is provided connected to the NCP 4. The system data storage 40 can also be provided separately, for example in a network server or in combination with other network devices. The system 1 may also be decentralized with intelligent telephone units connected by a network (essentially moving call processor functions to the network telephone devices 20).

With a system having a main control processor 4, this NCP 4 may be connected to multiple data storage facilities. The NCP 4 may be a stand alone unit or it may be in the same chassis as cards 16, 26 and 22, or NCP 4 may be provided with the server.

The NCP 4 monitors telephone network traffic and other network features. The processor cooperates to establish conference calls and establishes system user data. The processor may also monitor other network functions or may receive packets from other network control devices relating to network functions such as status, errors, faults etc. The NCP 4 may use the direct connection 38 to the Ethernet network 18 via a MAC device and physical interface. As an alternative to the embodiment shown in FIG. 1, the NCP 4 may be directly connected to the server which itself is connected to the Ethernet network 18. The data storage 40 may be connected to the server.

Figure 2:
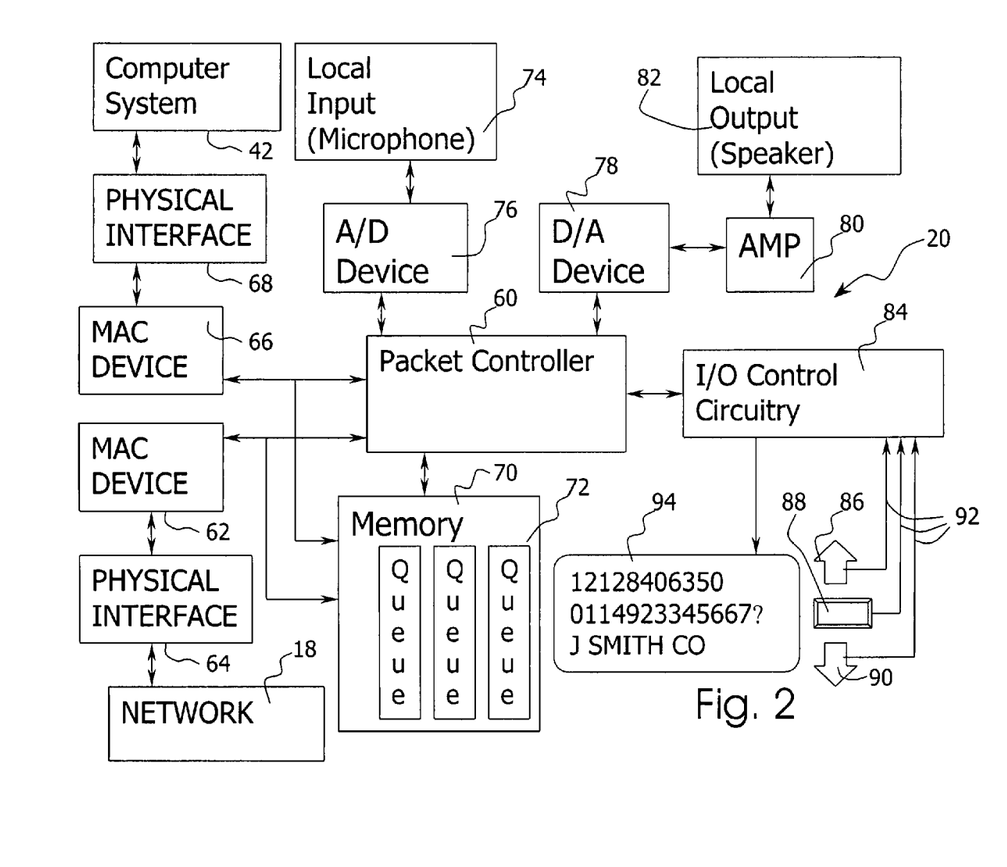
FIG. 2 is a diagram showing features of a network telephone device according to the invention.

FIG. 2 shows features of a network telephone unit 20. The network telephone 20 includes a packet controller 60 for receiving packets, sending packets and forwarding packets received from the network 1 to an associated network device 42, when the packet is addressed to the associated device 42. The device 20 may be used such that multiple collision domains may be provided. Two different collision domains (using CSMA/CD) are established in the example, one at the side of the computer system 42 and one at the network 1 (this is explained in application Ser. Nos. 09/204,102; 09/203,542; and 09/204,107, which are hereby incorporated by reference). The network telephones may be provided as described in U.S. application Ser. No. 09/204,102; and/or U.S. application Ser. No. 09/203,542; and/or U.S. application Ser. No. 09/204,107. The network device may also be a remote device connected to the NCP 4 and other telephone units. For conference calls, the members may be connected over one or more network (e.g., more than one Ethernet collision domain) including connections by public telephone lines and the Internet (e.g., conference members across one or more IP router).

According to a preferred embodiment of the invention, the network telephone 20 includes a base unit with handset. Basic function keys (numbers etc.) may be provided (e.g/, on the handset or on the base). The network telephone 20 has a connection to the Ethernet type network 18 discussed above. Each unit 20 has at least a MAC device 62 connecting the unit via a physical interface 64 to the network 18. Preferably another MAC device 66 is provided connecting the unit via physical interface 68 to an associated network device 42, such as a network interface card of a computer system 42. Packets are sent and received over the network 18 and packets are sent and forwarded to the computer system 42 via the packet controller 60 from the network 18 or packets are forwarded from the computer system 42 via the packet controller 60 to the network 18. A memory 70 is provided whereby packets can be queued as shown at 72 for play out, for mixing or some other memory functions can be provided. A local input 74 in the form of a microphone is provided in the handset with an analog to digital converter device 76 providing the local input to the packet controller 60. At the output side a digital to analog converter device 78 converts packets to audio signals which are amplified at amplifier 80 and produced at local output (speaker) 82. The network telephone 20 includes input/output control circuitry 84 for controlling a display 94 as well as for receiving input signals from keys such as keys 86, 88 and 90 via connection circuitry 92 (see FIG. 3). The display 94 is preferably a liquid crystal display (LCD). The packet controller 60 may include a timer, a digital signal processor (DSP), a processor (e.g., an ARM processor), a direct memory access (DMA) controller, control circuitry, an address table, and a memory controller coupled to each other by a signal bus. The DSP is in electrical communication with the A/D device 78 via a signal path and in electrical communication with D/A device 78 via a signal path. The memory controller is in electrical communication with the memory 70 by signal lines. The DMA controller is in electrical communication with the MAC devices 62, 66 by signal lines. The address table stores addresses that are of importance to the network telephone 20. Examples of such addresses include the address of the other network telephones 20, or network devices (e.g., line card 26, 22 connecting to telephones via outside lines or internet connection IP address) for a call or a conference call, or an identifier for a conference call, and a general broadcast address.

In operation, a network is established with a processor 4 monitoring some network system attributes and receiving signals from other network devices. Calls are initiated by users at the user telephone network devices 20 under the control of the NCP 4. The NCP 4 establishes a user database with system memory or system data storage facility 40 as indicated at 89 in FIG. 4. The data can include system user preferences such as the allocation of actuation key functions on the user's network telephone unit 20. The database may include other preferences such as ring tones, speaker phone use, message preferences and other features. The data particularly includes names, addresses and associated telephone numbers or other connection data including numbers or addresses.

The units 20 function like an ordinary PBX type telephone. A telephone call from the outside telephone line is either sent directly to the unit 20 or it is sent to the unit 20 via another network device acting as an operator (this is either with human intervention or an automatic system). The NCP 4 monitors and controls voice packets and sends control packets to the network telephone units 20. When the user takes the handset into an off hook condition, the packet controller 22 begins receiving voice packets which are queued in a queue 72 and are sent to the speaker 82 after digital signal processing, at the DSP, if necessary. The signal is converted at D/A converter device 78, it is amplified at the amp 80 before being output at the speaker 82. The device 20 also provides the ability to engage in a conference call by combining received packets. A page or further input may also be combined from another device connected to the local telephone network 10.

The NCP 4 maintains state information for all devices (network telephones and interface devices cards connected to PC's attached to the network) in the telephone network. When a call is made from a network telephone 20, each digit that is pressed is sent to the NCP. The NCP collects the digits and, using an internal dial plan, determines how to route the call (internal call, external call, etc.). In addition, the NCP 4 may be used to record the dialed number and store it in a database in storage 96 where it can be accessed later via the phone's LCD 94 or via the Web Based interface 100.

The user of the network telephone device 20 can engage in a conference call (i.e., a conversation with users of two or more other telephone sets connected to the network 1). The other telephone sets may be network telephone devices 20 in the telephone network system 1. The other telephone sets may also be remote telephone sets connected to the telephone network system 1 via a line card 22 or some other connection to another network (e.g., the public phone network, a wireless network, the internet, etc). From audio signals produced by the user, the network telephone device 20 generates packets including voice data. The network telephone device 20 then transmits the generated packets to the network 12.

In one embodiment, each telephone set involved in the conference call receives a list of all participants at the start of the conference call. This list may be generated by the NCP 4. This list of participants can be generated prior to the start of the conference call and can change as participants are added or dropped. The network telephone device 20 generates a unicast packet for each other telephone set on the list of participants. For example, when the network telephone device 20 is engaged in a conference call with two other participants, the network telephone device 20 generates two unicast packets having the same voice data and the network telephone device 20 as the source address. The destination address in one of the two unicast packets is the address of one of the two other telephone sets, and the destination address in the second unicast packet is the other of the two other telephone sets. The address may be the line card 22 (for connection via an outside line to a remote telephone set). Several of the conference call participants may be remote telephone sets connected to the telephone network system 1 via a line card 22 or some other connection such as digital line card 26.

Figure 3:
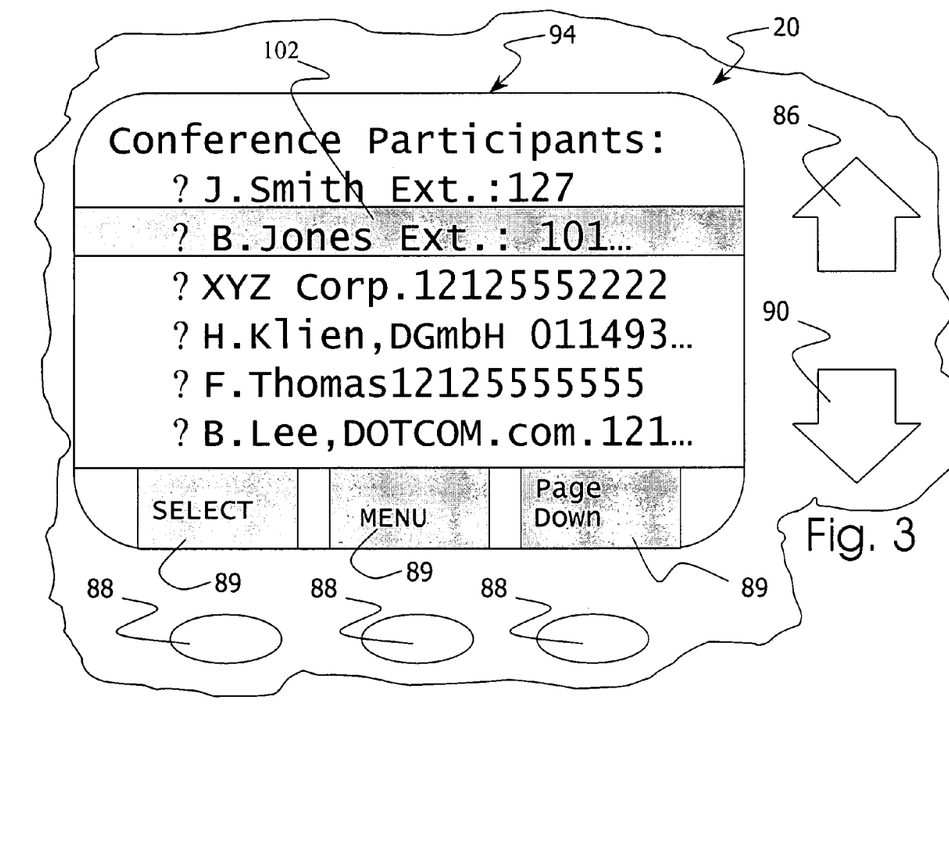
FIG. 3 is a cutaway top view showing a display with softkey display regions for keys of a network telephone for dropping a conference call participant.

When the network call processor 4 forwards the list of conference call participants to a network telephone device 20, the network telephone device 20 (or other connected network device 42) uses the list for information for a display as shown in FIG. 3. If participants drop out of the conference call, the NCP 4 updates the list such that the display 94 can be updated. Depending upon the system settings a user of the network telephone device 20 can drop one or more of the conference participants. Further, control of the ability to drop or add participants can be selected and even changed during a conference call. For example, extension 101 can initiate the call and include two other participants from the telephone network system 1 and two other participants using outside lines connected to one or more line card 22. The user at extension 101 uses the conference feature to select the outside lines, make the connection as well as to select the other extensions to make the connection and join the parties in a conference call. The control of the other telephone sets, which are participating, may subsequently be given to extension 127. Participant 127 may then drop extension 101 or drop one of the participants from the outside lines or otherwise have control of participants (other participants may be joined).

Various options may be provided. The display 94 provided on the telephone unit 20 preferably includes soft keys 89 and associated buttons 88 for making selections and for control of the content of the display. Pressing button 88 under "select" can be used to open further a display screen (a window) whereby further actions may be taken such as dropping the participant from the conference participants. The system may allow other actions such as dropping two participants to form a separate call or droping three participants from the conference participants wherein these three participants form a further conference call.

The ability to drop any of the conference participants is only limited in situations where the conference call is initiated at a telephone set outside of the telephone network system 1, in which case conference participants in the already established conference call cannot be dropped by the user of the telephone unit 20. However, where a conference call is originated by a telephone set outside of the telephone network system 1, the user of the telephone unit 20, or even some other network device 42 can be given rights to drop one or more of the participants which are part of the telephone network system 1. In such a case a signal may be sent to the network call processor 4 to disconnect one or more of the telephone units 20 (e.g., by dropping the unit from the list of participants) from the conference call connected to an outside line by a line card 22.

In another embodiment according to the invention, at the start of the conference call, each telephone set receives an identifier associated with the conference call. This identifier can be generated prior to the start of the conference call by the NCP 4 and can change during the conference call (when participants change or for other reasons). The network telephone device 20 generates multi-cast packets that include the identifier associated with the conference call. In each multi-cast packet, the network telephone device 20 is the source address and the identifier can be the destination address.

The network telephone device 20 combines only those packets from telephone sets known to be engaged in the conference call. For unicast packets, the source address of the received packets can be compared against the list of participants. For multi-cast packets, the identifier can indicate whether the packet came from a participant of the conference call.

According to this further embodiment, a line card 22, or other connection to outside networks, such as digital line card 26, also prepares multicast packets with the identifier. This can indicate that the packet comes from a participant of the conference call. The NCP 4 may selectively be used to provide a list of participants to any network device such as network telephone unit 20 or even computer 42 whereby the user of the network device can select participants and then drop participants of the conference call.

In both of the embodiments noted above, when the network telephone device 20 receives a packet, the network telephone device 20 determines that the packet came from a participant in the conference call, produces audio signals corresponding to the voice data in the packet, and outputs the audio signals to the handset (or speaker). When multiple packets arrive at a telephone set from different sources, that telephone set combines the received packets and outputs audio signals corresponding to the voice data of the combination. The network telephone device 20 can combine packets received from other telephone sets with packets generated by the network telephone device 20 from locally received audio signals (i.e., from the local input 74).

To produce the combination, the network telephone device 20 can combine the voice data of the received packets or select for processing (i.e., producing audio signals from the voice data packets) one or more of the packets according to some predetermined criteria. One criterion can be to process the packet with the voice data having the highest volume (i.e., loudest). The telephone device 20 can discard or forward unused voice data packets. The telephone device 20 can also combine voice data packets along with sound data which can be heard only by the user of the telephone device 20. This can be for example a tone to indicate that another call is come in or it may be a synthetic voice announcing the addition or drop of a conference participant. Other features include a timing tone to indicate elapsed time or even an interrupting voice data packet from another telephone device 20 (assistant device) or from an outside source.

One or more members of the conference call may drop a member of a conference call preferably by asking if the party initiating the drop if they are sure they would like to drop the party they just selected to drop. If the user confirms, then the party being dropped should ideally be notified just before being dropped that they will be dropped in a few seconds. These few seconds can be used up by the user confirming the drop. All conference members using system features of the invention see on their LCD 94 (or other display) the members of the Conference call and/or users who are not a member of the conference call. The LCD on the device 20 is preferably large enough to display, if not all, most of the parties of the conference call. The list of users is tied with the user associated with the particular device 20 or outside line, or other connection. All members have a marker on the LCD beside their name and an extension identifier identifying them as the members associated with the user of that device. The identifier identifying is then used to indicate permission to drop.

The invention addresses the most annoying feature in today's conference call by allowing members to know who all of the members are on the call at any given moment. The invention may be provided with a very large and advanced GUI on the LCD or display of an associated computer. Information is stored with the NCP about the ownership of conference call members, i.e. who added them to the call and as a result who has permission to remove them from the call. Information is stored about the sequence of the members who joined a conference call. Information is maintained with regard to the order in which each member has entered the conference call. This facilitates the system prioritization of the members if required. This is particularly beneficial in a situation where there are limited resources when calling over a bridge into a conference call and there are only a specified number of resources (ports) to dial into. In such a situation the call originator may wish to drop a party who's been on the call for a long time and introduce a more important member to the conference call. Maintaining the sequential order of conference call members joining is beneficial when a blind drop is made (as in prior art telephone systems) or where the LIFO (Last In First Out) scheme is used to drop members. The order and identity as well as other information may be used for dynamic call conference management.

The user does not have to enter his/her user profile (such as their name, number, phone's MAC address etc.). The system handles this automatically once the member joins the conference call. For callers that are internal, the system has all the pertinent information to display anything ranging from the user phone's MAC address, the phone extension, the full name of the user and any other relevant information. This is possible when implementing the system using a UML (Unified Modeling Language) based real-time object oriented modeling tool for the call processing/control system. The external conference call participants may also be managed using caller ID information, IP address information or stored numbers from past calls made (and IP addresses from past connections made via IP routers).

Other ways of providing a conference drop include using voice recognition whereby a user can e.g., say 'drop 7677' and the system will translate this information into a signal that triggers the NCP to initiate the process of dropping extension 7677 from the conference call.

Another alternative way of dropping uses touch sensitive screens on the phone or connected computer device whereby all conference call members are listed on the LCD 94 display of the phone and instead of pressing a conference drop button, the user may select a member on the screen by a simple touch of the screen. This will send the signal to the NCP to check if this person is allowed to drop this party and if so, drop him/her from the call and update the LCD display.

The conference drop feature may also be provided via a web interface (browser). The system supports a web browser called NetSet that gives administrators and user access to system settings and configurations. Advanced Conference Drop is then tailored to work in tandem with this UI. One can either be logged into the web interface as a user or as an administrator. The behavior for both should be the same, for the most part. However the administrator should have some extra permissions, for example, maybe to drop any member on the conference call. The user can only drop those whom they added or have a drop preivilidge value assigned to assign drop rights.

The procedure is as follows: The user logs into the web interface using a password and user ID. The user pulls up a Conference Call List tab. This tab/window displays all members of the conference call in the order that they joined or any order that should be able to be user configurable. All members whom the browser has permission to drop are uniquely identified by a unique marker (either a star, or a different colored font or larger font etc.). The user selects a member by clicking on a conference call member and pushes a drop button on the web page. A new screen pops-up with the presenting one of the following options:

a. Are you sure you want to drop this member?

b. ERROR! "Not Allowed" to drop this member.

When a user confirms according to option (a) that yes, they intend to drop that member from the call, a second window pops-up prompting the user the following options.

A. Notify member that he will be dropped?

B. Play audible 'beep' warning to everyone to notify them that someone has exited the conference call as a result of being dropped.

Update display (e.g., the LCDs 94) on ALL the conference call members' phones by removing the user who just got dropped from the list.

An example of the web page preferably lists all members in the conference call. The users tab may be a 'Conference-CallUsers' tab listing all members just as they are shown here in our current existing web interface for the NBX system.

Figure 4:
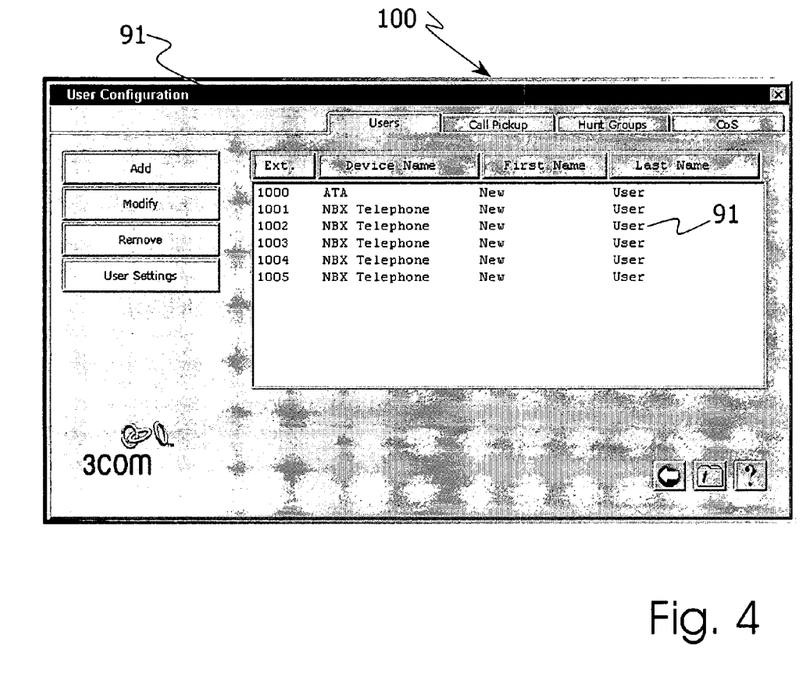
FIG. 4 is a view showing an example of a web browser software interface used at a network device.

As shown in FIG. 4 the NCP 4 web browser software interface 100 (e.g., NETSCAPE or MICROSOFT EXPLORER) is established on at least one network device 42. The browser software 100 provides access with the network device 42 by entering the NCP/database location in the browser location window or "go to" window. This address is established with respect to the NCP 4 and the data storage. The browser 100 then accesses the web pages (e.g. HTML pages) 91 set up on the system (saved in the central database on storage 40). Some of the content is provided with the system while other data is entered into the system after installation. Upon accessing the web pages, the user can then enter preferences, enter data, revise data which is provided and revise old data as shown at 95. This allows the user to add names, telephone numbers, addresses and other information. The web browser software interface 100 can receive a list 93 of conference call participants. The user can then use the interface to select a conference call participant and then drop the selected participant. In FIG. 4, the web browser interface screen is shown with "User Configuration" written on the tab of the window, in the case of Advanced Conference Drop, there would be a similar tab with a label saying "Conference Call Members".

Figure 5A:
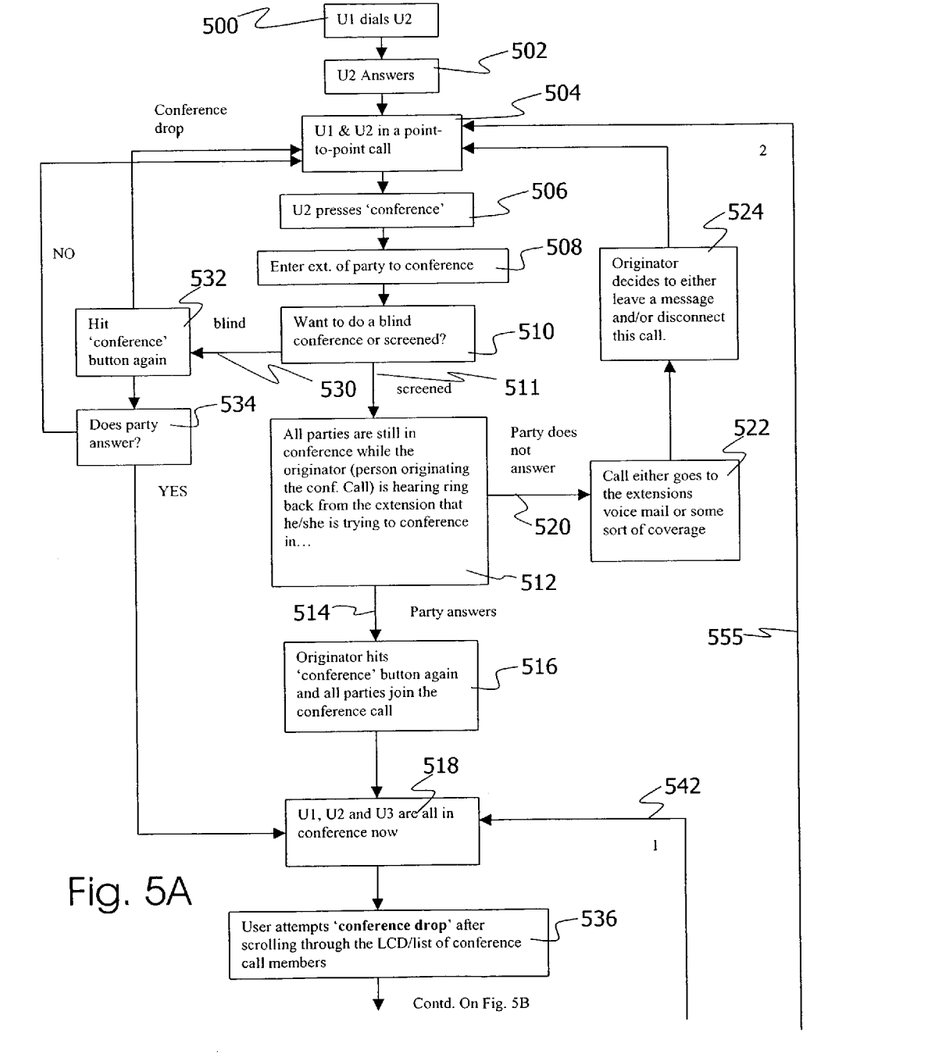
FIG. 5A is a first part of a flow diagram describing features according to a process of the invention.
Figure 5B:
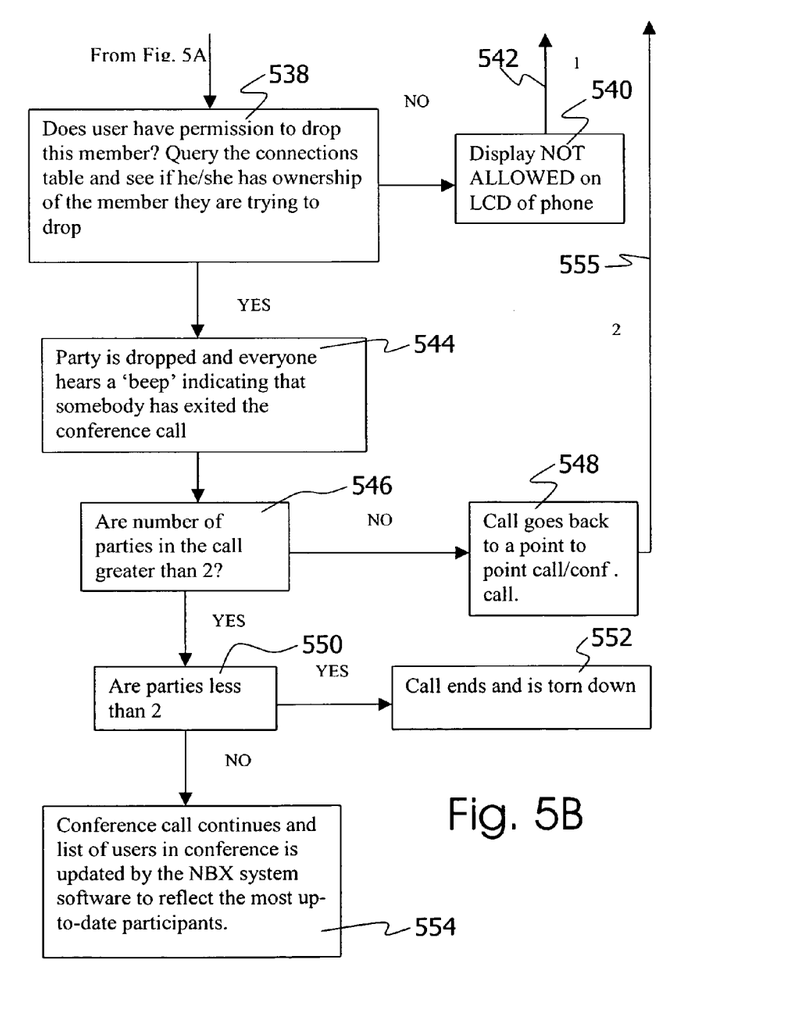
FIG. 5B is a second part of the flow diagram of FIG. 5A according to a process of the invention.

FIGS. 5*a* and 5*b* show a flow chart of a conference call setup with advanced conference drop according to the invention. In this example U1, U2 and U3 are either other telephone units 20 in the system or are parties reached through outside lines through one of the line cards. But other connections are possible. Further, obviously either party could initiate a conference call and various combinations are possible generally following the procedure shown in 5*a* and 5*b*.

The conference call is initiated at 500 with U1 dialing U2. U2 answers at 502. At step 504 U1 and U2 are in a point to point call. Either party may then press the conference button or send a code representing pressing the conference button on one of the units 20. At 508 U2 enters the extension of the party to be conferenced in or some other address or outside line phone number to establish the conference call. The process can consider whether the conference is to be a blind or a screened conference at step 510. In the case of a screened conference at 511 all parties are still in conference while the originator (person originating the conference call) is hearing a ring from the extension number that is trying to be conferenced in. This is indicated at step 512. Of course if the party does not answer at 520 the caller however goes to a machine or voice mail or some other type of coverage at 522 and the originator U2 decides either to leave a message or disconnect at 524.

For the party answers as indicated at 514 the originator hits the conference button again such that all parties join the conference call as indicated at 516. Parties U1, U2, and U3 are all in conference as indicated at 518. In the case of a blind conference as indicated at 530 the originator U2 hits "conference" again as indicated at 532. Again it is considered whether the party answers or not at 534 and a conference is established at 518.

During the course of the call a user (user U1, U2, U3 . . . Un) may attempt to make a conference drop. This is accomplished by scrolling through a list either on the LCD 94 or on an associated computer, the list comprising information as to the conference call members. The information may obviously be simple numbers but may also be names depending upon the information collected as to the particular connection. At step 538 it is considered whether the user has permission to drop the particular member. The connections table established by the NCP is then queried to see if the particular person has ownership rights or conference control rights of the particular member for which a drop is requested. Based on the software established or even the limitations of a particular user (not having a display or an interface for making the conference drop) the drop is denied at 540 and as shown at step 542 the users are all still in the conference call.

If a particular user that requests a conference drop has rights to do this, the process proceeds as indicated at 544 where a party is dropped. Preferably some information is provided to indicate that someone has exited the conference call. This may simply be via the display 94 or computer interface (other wireless or other interface) thereby an indication is provided visually that someone has left the conference call. Of course an audio signal may also be provided including a voice synthesized voice indicating the name of the person who has left the conference call. The process proceeds at 546 where it is considered whether the number of parties in the present call are greater than two (does a conference call still exist?). If a conference call does not exist the call proceeds at 548 back to a point to point call. At 550 it is considered whether less than two parties are on the call. In such case the call is broken down as indicated at 552. If sufficient members of a conference call still exist, the conference call continues an a list of users in the conference is updated by system software such as operated through the NCP such that the users of the system have displays which reflect the most up to date participants as indicated at 554.

The invention provides various possibilities with regards to a system that provides all traditional features of a PBX system as well as the potential for interconnections including sending voice packets over IP routers for connection to remote users of a telephone device 20 or a similar device. Various different possibilities of conference calls with users at a location of the NCP as well as users connected to the NCP through various sources are possible. The invention does contemplate conference calls primarily using the interconnected devices 20 wherein if all conference users are external to the system (the last link through a line card to a user 20 is disconnected), the conference call would end, unless an appropriate substitute control facility is provided.

While specific embodiments of the invention have been shown and described in detail to illustrate the application of the principles of the invention, it will be understood that the invention may be embodied otherwise without departing from such principles.

What is claimed is:

1. A conference call telephone system, comprising:
one or more network;
three or more telephone units interconnected by said one or more network to provide three or more participants of a conference call, at least one of said telephone units receiving and sending data packets including voice data packets;
a display connected to at least one of said telephone units or forming a part of at least one of said telephone units;
a device for monitoring calls of at least one of said telephone units to provide data to said display for showing conference call participant information as to the telephone units participating in the conference call;
an input device associated with said display for selecting any of the telephone units from the conference call participant information and dropping the selected telephone unit from the conference call.

2. A conference call telephone system according to claim 1, wherein at least two of said three or more telephone units receive and send data packets including voice data packets.

3. A conference call telephone system according to claim 1, further comprising a telephone line network interface, said one or more network including a first network connected to said at least one of said telephone units receiving and sending data packets and connected to said telephone line network interface for receiving data packets including packets with telephone voice data, said one or more network including a public telephone network, said telephone line network interface being connected to said public telephone network to establish one or more line connections to one or more telephone units to form a branch exchange.

4. A conference call telephone system according to claim 1, wherein said display is provided as part of at least one of said telephone units receiving and sending data packets and said input device is provided as part of at least one of said telephone units receiving and sending data packets.

5. A conference call telephone system according to claim 4, wherein said input device includes a button positioned adjacent to said display and a portion of said display indicating the function of said button.

6. A conference call telephone system according to claim 1, wherein said display is a display associated with a computer network device, and said input device is provided as part of said computer network device.

7. A conference call telephone system according to claim 6, wherein said input device includes web browser software operating on said computer network device.

8. A network telephone system comprising:
a distributed network;
a plurality of network telephones, each network telephone being connected to said distributed network, each network telephone having a display for displaying information, each network telephone being capable of engaging in a concurrent telephonic communication with two or more of said plurality of network telephones to establish a conference call, each of said plurality of network telephones including an I/O device in electrical communication with the network for receiving and sending packets to other devices connected to the network and a packet controller in electrical communication with the I/O device and the input device, the packet controller combining packets received by the I/O device;
a display connected to or associated with at least one of said plurality of network telephones;
an input device connected to or associated with said display, said display displaying all or part of a list on said display corresponding to an identity of each source of packets combined whereby an identity may be selected for dropping a source, thereby dropping a participant from the conference call.

9. A conference call telephone system according to claim 8, further comprising a telephone line network interface for receiving data packets including packets with telephone voice data and being connected to a public telephone network to establish one or more line connections to one or more telephone units to form a branch exchange.

10. A conference call telephone system according to claim 9, further comprising a network call processor connected to said distributed network for monitoring data traffic to and from said plurality of network telephones, said call processor establishing a conference call including generating a list of all participants and forwarding the list to one or more of said plurality of network telephones in said list of all participants for sending multicast or unicast transmissions to the network address based on said list of all participants.

11. A conference call telephone system according to claim 10, wherein the conference call participants in said list of participants include telephone units outside of said distributed network, connected to said distributed network via said line interface, said multicast or unicast transmissions including transmissions addressed to said line network interface.

12. A conference call telephone system according to claim 10, further comprising a network call processor connected to said distribution network for monitoring data traffic to and from said plurality of network telephones, said call processor establishing a conference call including generating an identifier associated with the conference call and forwarding the identifier to one or more of said plurality of network telephones in said list of all participants for sending multicast transmissions to the network address based on said identifier associated with the conference call.

13. A conference call telephone system according to claim 12, wherein the conference call participants of said identifier associated with the conference call includes telephone units outside of said distributed network, connected to said distributed network via said line interface, unicast transmissions including transmissions addressing said line network interface.

14. A conference call telephone system according to claim 8, wherein said display is provided as part of at least one of said network telephones receiving and sending data packets and said input device is provided as part of at least one of said network telephones receiving and sending data packets, wherein said input device includes a button positioned adjacent to said display and a portion of said display indicating the function of said button.

15. A conference call telephone system according to claim 8, wherein said display is a display associated with a computer network device, and said input device is provided as part of said computer network device and includes web browser software operating on said computer network device.

16. A telephone conference call process, comprising the steps of:
providing a network;
providing at least three telecommunication devices connected to the network;
receiving and sending packets from each device to other devices connected to the network by one of a network connection associated with the telecommunication device and an interface to the network via a public network or the internet;
combining packets received by the telecommunication devices for a concurrent telephonic communications and producing an audio signal with the combined packets;
forming a list of telecommunication devices participating in the concurrent telephonic communications and displaying all or a part of the list at one of said at least three telecommunication devices; and
removing one or more of the devices participating in the concurrent telephonic communications by selecting the one or more of the devices participating in the concurrent telephonic communications from said list.

17. A network telephone system comprising:
a distributed network;
a network call processor with data storage forming a central database, said call processor being connected to said distributed network;
a telephone line network interface connected to a telephone line and connected to said distributed network for receiving packets from said distributed network and sending packets to said distributed network including packets with telephone voice data;
a plurality of network telephones, each network telephone being connected to said distributed network, each network telephone having a display for displaying information, each network telephone being capable of engaging in a concurrent telephonic communication and including:

an I/O device in electrical communication with the distributed network for receiving and sending packets to other devices connected to the network;

an input device for producing audio signals from an input local to the device;

a packet controller in electrical communication with the I/O device and the input device, the packet controller generating packets from the audio signals received by the input device, forwarding the generated packets to the I/O device for transmission to the network combining packets received by the I/O device and producing an audio signal with the combined packets and the audio signals from the local input device and display information on a display corresponding to an identity of a source of packets combined whereby said identity may be selected for dropping a source form a concurrent telephonic communication.

18. A telephone system according to claim 17, wherein:
said identity is different than an identity of a respective said network phone.

19. A conference call telephone system according to claim 8, wherein:
said identity is different than an identity of a respective said network phone.

20. A telephone conference call system according to claim 8, wherein:
said removing includes selectively removing any one of said devices.

* * * * *